United States Patent
Schumacher et al.

(10) Patent No.: US 7,137,645 B2
(45) Date of Patent: Nov. 21, 2006

(54) CONTROL DEVICE FOR A RESTRAINING SYSTEM IN A MOTOR VEHICLE

(75) Inventors: Hartmut Schumacher, Freiberg (DE); Peter Taufer, Renningen (DE); Torsten Grotendiek, Bietigheim-Bissingen (DE); Harald Tschentscher, Grossbottwar (DE); Werner Weber, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 375 days.

(21) Appl. No.: 10/432,486

(22) PCT Filed: Oct. 19, 2001

(86) PCT No.: PCT/DE01/03992

§ 371 (c)(1),
(2), (4) Date: Dec. 31, 2003

(87) PCT Pub. No.: WO02/42123

PCT Pub. Date: May 30, 2002

(65) Prior Publication Data

US 2004/0094349 A1     May 20, 2004

(30) Foreign Application Priority Data

Nov. 21, 2000 (DE) .............................. 100 57 916

(51) Int. Cl.
*B60R 21/01*     (2006.01)
(52) U.S. Cl. .................. 280/735; 701/45; 180/282; 307/10.1
(58) Field of Classification Search ............... 307/10.1; 701/45; 280/735; 180/282
See application file for complete search history.

(56) References Cited

U.S. PATENT DOCUMENTS

| | | | | |
|---|---|---|---|---|
| 5,373,722 A | * | 12/1994 | Spies et al. | 73/1.39 |
| 5,544,915 A | * | 8/1996 | Fendt et al. | 280/735 |
| 6,226,578 B1 | * | 5/2001 | Willerton et al. | 701/36 |
| 6,628,007 B1 | * | 9/2003 | Baumgartner | 307/10.1 |

FOREIGN PATENT DOCUMENTS

| | | |
|---|---|---|
| DE | 37 36 294 | 5/1989 |
| DE | 44 25 846 | 1/1996 |
| DE | 37 06 765 | 9/1998 |
| DE | 198 52 468 | 5/2000 |
| DE | 199 18 634 | 11/2000 |
| EP | 0 518 501 | 12/1992 |
| WO | WO 00/29263 A1 * | 5/2000 |
| WO | WO 00 41918 | 7/2000 |

* cited by examiner

*Primary Examiner*—Ruth Ilan
(74) *Attorney, Agent, or Firm*—Kenyon & Kenyon LLP

(57) ABSTRACT

A control device for a restraining system in a motor vehicle is proposed, a safety switch, which also includes a watchdog, performing the function of a safety switch in the control device. The safety switch monitors sensor signals which are transmitted to the processor of the control device for plausibility and triggers appropriate restraining systems via a time unit for a predefined time period only when the safety switch itself detects a trigger event. On the basis of supplementary data from the sensor signals, the safety switch infers how the sensor signals are to be processed. The safety switch is designed such that it triggers the restraining systems correspondingly assigned to the sensors. When the control device is switched on, the processor performs a test of the safety switch by generating a test signal using the sensors.

9 Claims, 1 Drawing Sheet

CONTROL DEVICE FOR A RESTRAINING SYSTEM IN A MOTOR VEHICLE

FIELD OF THE INVENTION

The present invention is directed to a control device for a restraining system in a motor vehicle.

BACKGROUND INFORMATION

Airbag-control systems in which a micro-controller as the processor is monitored for its function by a watchdog are already known. The processor itself is connected to various sensors in the motor vehicle or in the control device, the sensors sensing an impact. In some cases, airbag control devices use mechanical safety switches in which during negative accelerations a ring magnet is moved against a spring, whereupon a reed contact closes. The reed contact then triggers the restraining means associated with this delay direction, either directly via a triggering signal to the output stages, or indirectly via the micro-controller. In some instances, the generated signal also triggers a safety semiconductor lying in the main ignition-current path, which allows the required ignition current to flow to the output stages.

SUMMARY OF THE INVENTION

In contrast, the control device for a restraining system in a motor vehicle has the advantage over the related art that a safety switch is provided which includes a watchdog as well. The functionality of the safety switch is made possible in that the safety switch independently checks the sensor signals transmitted from the sensors to the processor and triggers output stages for ignition circuits via a time unit as a function of the check result. In the process, a safety switch is realized which evaluates sensor signals from every sensed direction, thereby providing a multidirectional safety switch. As a result, an additional protection which is independent of the functionality of the micro-processor is available, so that the safety with respect to an undesired triggering by a defective processor is increased. Moreover, the safety switch includes appropriate hardware for using individual algorithms and thresholds for the different sensor signals. Redundant hardware to avoid an unwanted triggering of restraining means is thus provided as well.

It is particularly advantageous that the safety switch extracts additional data from the sensor signals and processes the sensor signals as a function of these additional data. In this case, these additional data are status data of the sensor, for instance, indicative of a running test or a detected error, and also channel-specific data, such as an identification that sorts the sensor signals into trigger-relevant and not trigger-relevant, and, in the case of trigger relevance, additionally indicates the type of signal source, that is, whether a front-impact sensor, a side-impact sensor or acceleration signals from satellites are involved, which are sensors distributed over the vehicle. On the basis of these additional data, the safety switch then uses the appropriate hardware algorithm and the appropriate thresholds to correctly process these sensor signals.

Moreover, it is advantageous that the safety switch loads the appropriate algorithms from its own hardware as a function of the additional sensor data and uses corresponding threshold values to process the sensor signals. If appropriate, the output stages are then triggered as a function of these additional data as well. Using the additional data, it is then possible to control the processing of the sensor signals.

Moreover, it is advantageous that the safety switch allows a triggering of only those output stages that are assigned to the respective sensors, so that if a side-impact sensor detects a sensor signal only the side-impact protection is triggered.

Furthermore, it is advantageous that the control device is switched on upon starting the vehicle and a test of the safety switch according to the present invention is performed by generating a test signal of the sensors. In this way, the processor ascertains whether the safety switch is able to monitor the sensor signals and transmit corresponding trigger signals to the output stages.

Finally, it is also advantageous that the safety switch is connected to the output stages via two trigger lines, one of the trigger lines being connected for the plus-output stages, and another trigger line being connected to the minus-output stages, so that all output stages are able to be blocked or triggered via these two lines. Via additional group lines, the safety switch may be connected to the output stages of the individual igniter groups, thereby making it possible to trigger ignitors in a selective manner, such as the front airbags in the event of a front impact.

DETAILED DESCRIPTION

As a result of the growing use of an increasing number of restraining systems, especially airbags in motor vehicles, these restraining systems are triggered in a manner that is appropriate to the situation. An incorrect triggering of a restraining system, which may lead to serious injuries, on the one hand, and cause unnecessary expense for the vehicle owner, on the other hand, is critical. Therefore, according to the present invention a control device for a restraining system in a motor vehicle is proposed which has a safety switch that also includes a watchdog which, in addition to monitoring the processor, checks the sensor values of the individual crash sensors for plausibility as well and only triggers the appropriate output stages of the ignition circuits to be triggered once the safety switch itself detects a trigger event. In this context, it is provided, in particular, that the safety switch selectively triggers the groups of restraining systems associated with the individual sensors. The restraining systems, such as airbags, are fired via the ignition circuits to be triggered, which in turn are operated by way of output stages, the output stages being triggered by an ignition-circuit control, i.e., an integrated switching circuit. The ignition-circuit control is in turn connected to the processor and, according to the present invention, here also to the safety switch, in order to trigger the appropriate output stages only when a trigger event has been detected.

Figure 1:
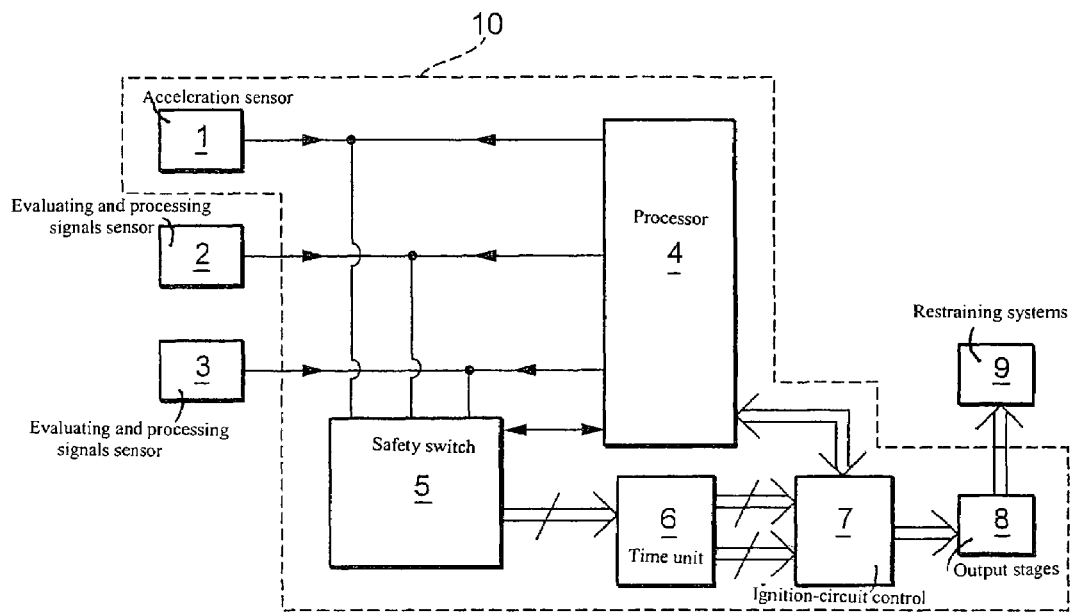
FIG. 1 shows a block diagram of the control device according to the present invention.

FIG. 1 shows a block diagram of the control device according to the present invention which is connected to sensors and restraining systems. An acceleration sensor 1 in the travel direction is connected to a first data input/output of a processor 4, which in this case is a micro-controller. Acceleration sensor 1 has electronics that amplify and digitize the measuring signals. In addition, these electronics add supplementary data as to whether a fault exists or whether a running test is involved. Additional channel-specific data, for instance, is a safety-I.D. which classifies the sensor signals as trigger-relevant and not trigger-relevant and, in the event of trigger relevance, indicates the type of signal source, namely whether a front sensor, side sensor or a satellite sensor is involved.

At a second data input/output of processor 4, a side-impact sensor 2 is connected on the right passenger door. This side-impact sensor 2 includes electronics corresponding to those of sensor 1 for evaluating and processing the signals. The same also holds true for a sensor 3 which is used for side-impact sensing on the driver side. Sensor 3 is connected to the third data input/output of processor 4. The lines connecting sensors 1, 2 and 3 to processor 4 are each tapped to transmit these signals to the first, second and third data input of a safety switch 5 as well.

To check the operativeness of processor 4, the watchdog in safety switch 5 is connected to a fourth data input/output of processor 4 via a data input/output. This check may be performed through test queries which are transmitted to processor 4 and are answered by processor 4 in an appropriate manner in order to prove its operativeness.

Via a data output having a plurality of lines, safety switch 5 is connected to a time unit 6. Time unit 6 represents part of the safety switch; in the block diagram a logic separation is executed here. Time unit 6 is connected via two data outputs, each of which has a plurality of lines, to an ignition-circuit control 7. Via a fifth data input/output, processor 4 is connected to a data input/output of ignition-circuit control 7. Ignition-circuit control 7, by way of a data output which also has a plurality of lines, is connected to output stages 8, which in turn are connected via an output to the restraining systems having ignition circuits 9.

Processor 4, safety switch 5 with time unit 6, ignition-circuit control 7, output stages 8 and sensor 1 are the components of control device 10 in this case. Furthermore, it is possible for control device 10 to have its own sensor platform to verify corresponding sensor signals from satellite sensors, i.e., sensors distributed over the vehicle, that is, to perform a plausibility check. Control device 10 may also be connected to vehicle busses to receive and transmit data, for instance, in order to make sensor data available to other vehicle systems. Safety switch 5 then performs a plausibility check of the sensor signals from sensors 1, 2 and 3 and triggers output stages via time unit 6 and ignition-circuit control 7 in the event that the sensor signals with supplementary data indicate a trigger event and safety switch 5 itself detects this trigger event on the basis of the sensor signals using calculated algorithms. For this purpose, safety switch 5 has its own hardware in which the appropriate algorithms and the appropriate thresholds are stored as well in order to process the individual sensor signals from sensors 1, 2 and 3. The direction from which the sensor signals come is of no consequence here. Safety switch 5 is designed such that it is able to process and check the sensor signals for trigger events, regardless from which sensor they originate. In this way, a multi-directional electronic safety switch is realized in an advantageous manner. Thus, the thresholds which safety switch 5 checks decide whether a sensor signal is trigger-relevant, i.e., whether a crash event is present or not. If this is not the case, safety switch 5 keeps the corresponding output stages blocked, processor 4 also being unable to overrule this decision. However, if safety switch 5 detects a trigger event, ignition-circuit control 7, via time unit 6, triggers these output stages for the corresponding restraining systems for a predefined period. Processor 4 can then activate these output stages following its own evaluation.

During start-up of the motor vehicle, control device 10 is switched on and a check of the individual IC's, to which safety switch 5 having a watchdog belongs as well, is performed. A sensor test is used to check the described functionality of safety switch 5 which, in addition, continually monitors processor 4 as well. A test response, that is, an artificial sensor signal, is generated in sensors 1, 2 and 3 which processor 4 reads in. This test response is such that, having been evaluated by safety switch 5, it leads to a triggering of the plus-output stages which have output stages 8. Safety switch 5 also reads these data in order to perform its monitoring function and evaluates the data. In the process, processor 4 monitors the data outputs of time unit 6 to ignition-circuit control 7 and is able to detect the correct function of safety switch 5 by the change of the signal level.

Since these sensor responses have been selected so large as to signal a crash event, a triggering of output stages 8 will take place. This triggering is monitored by processor 4. Thus, a test of safety switch 5 is always carried out when sensors 1, 2 and 3 themselves are tested. To protect against erroneous triggering of output stages 8 during the sensor test, safety switch 5 evaluates both the test request by processor 4 to sensors 1, 2 and 3, which leads to a blocking of the minus-output stages having output stages 8, and also the identification of running tests included in the sensor data, which likewise, but independently, leads to the blocking of the minus-output stages.

The parallel lines leading from safety switch 5 to time unit 6 have two trigger lines. These are general trigger lines, one being used for the plus-output stages and the second for the minus-output stages. Moreover, the parallel lines from safety switch 5 to time unit 6 have group lines, which may be used for the triggering of the respective groups of restraining systems, for instance, those that are used in the travel direction. Corresponding lines then lead from time unit 6 to ignition-circuit control 7. In a trigger event, time unit 6 triggers output stages 8 for a duration of several ten milliseconds.

Figure 2:
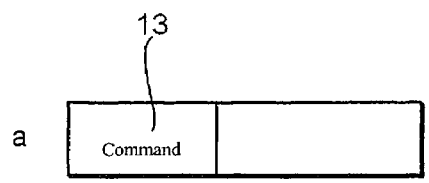
FIG. 2 shows a frame of the processor-sensor communication.
Figure 2:
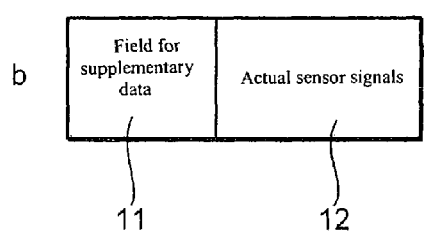

FIG. 2 shows a transmission frame. Part a is transmitted from processor 4 to sensors 1, 2 and 3. It has a 16-bit message which includes a command 13 to which the sensors respond with sensor data. Furthermore, FIG. 2 shows part b of the transmission frame which sensors 1, 2 and 3 retransmit, at the same time as part a, to processor 4 and safety switch 5, which has a field 11 for the supplementary data and a field 12 for the actual sensor signals. Safety switch 5 and processor 4 synchronize with these frames in order to then be able to correspondingly read out the individual data. This is called an IN-frame response.

In the following, the various events are described again and it is explained in which blockings of output stages 8 this will result in each instance. If the watchdog in safety switch 5 is in a blocking phase, i.e., the watchdog was not operated correctly and blocks for a predefined period of time, or if a sensor test is running, but no significant signal has been received yet, all plus-output stages and all minus-output stages and all ignitor groups are switched to blocking. However, if the watchdog in safety switch 5 is not in a blocking phase and no significant sensor signal was received from one of sensors 1, 2 and 3, all plus-output phases are blocked, whereas all minus-output stages are triggered in order to perform a test of the minus-output stages, if appropriate. However, all ignitor groups are blocked. If the watchdog in safety switch 5 is not in the blocking phase, and a sensor test is running and a significant signal was received, for example, from sensor 1, all plus-output stages are triggered, so that a test of the plus-output stages is possible, but all minus-output stages are blocked. However, the ignitors in the travel direction are triggered. If the watchdog in safety switch 5 is not in a blocking phase and the sensor test is underway and a significant signal was received, but not from sensor 1, all plus-output stages are triggered, so that a test of the plus-output stages is possible; all minus-output stages are blocked again and the ignitors in the travel direction are blocked as well. If the watchdog in safety switch 5 is not in the blocking phase and no sensor test is performed and a significant signal was received from sensor 1, all plus-output stages and likewise all minus-output stages are triggered, so that trigger readiness is given and the corresponding ignitors in the travel direction are triggered, so that a firing of the airbags is possible. If the watchdog in safety switch 5 is not in the blocking phase and no sensor test is performed and a significant signal was received, but not from sensor 1, all plus-output stages and all minus-output stages are triggered. Trigger readiness exists, but the ignitors in the travel direction are blocked. A significant signal in this context means that a signal is present which, calculated by the hardware algorithm of safety switch 5 and evaluated on the basis of the thresholds, indicates a trigger event.

What is claimed is:

1. A control device for a restraining system in a motor vehicle, comprising:
   a processor;
   at least one sensor connected to the processor, the at least one sensor sensing an impact of the motor vehicle;
   a safety switch for performing a watchdog for monitoring of the processor and for checking a sensor value of the at least one sensor;
   at least one output stage of an ignition circuit, the at least one output stage being connected to the processor and being for triggering the restraining system; and
   a time unit connected to the safety switch and for triggering the at least one output stage, wherein:
      the safety switch is able to be connected to the at least one sensor for a plausibility check of a sensor signal,
      the time unit triggers the at least one output stage as a function of the sensor signal and for a predefined period of time,
      the safety switch includes an arrangement for evaluating the sensor signal, and
      the arrangement for evaluating the sensor signal is configured such that the sensor signal is able to be processed and checked for a trigger event.

2. The control device as recited in claim 1, wherein:
the safety switch extracts supplementary data from the sensor signal and processes the sensor signal as a function of the supplementary data.

3. The control device as recited in claim 1, wherein:
the safety switch triggers the at least one output stage assigned to the at least one sensor.

4. The control device as recited in claim 1, wherein:
when the control device is switched on, the processor performs a test of the safety switch by generating a test signal of the at least one sensor.

5. The control device as recited in claim 1, wherein:
the at least one output stage includes plus-output stages, minus-output stages, and ignitor group output stages, and
the safety switch, via the time unit by way of two trigger lines, in each case is able to be connected to all the plus-output stages and all the minus-output stages, and by way of additional group lines to the ignitor group output stages.

6. The control device as recited in claim 5, wherein:
during a test one of at least one of the plus-output stages and at least one of the minus-output stages is able to be blocked.

7. The control device as recited in claim 1, wherein the safety switch includes an arrangement for using individual algorithms and thresholds for different sensor signals.

8. The control device as recited in claim 1, wherein the safety switch uses a appropriate hardware algorithm and an appropriate threshold to process sensor signals according to supplementary data.

9. The control device as recited in claim 8, wherein the supplementary data includes one of status data, channel-specific data, and data indicative of a type of signal source.

* * * * *